Oct. 17, 1961 R. N. HAYNIE 3,004,298
METHOD FOR MAKING FLUID SEALS
Original Filed Feb. 11, 1957 4 Sheets-Sheet 1

(# United States Patent Office)

3,004,298
METHOD FOR MAKING FLUID SEALS
Robert N. Haynie, Mountain View, Calif., assignor to Federal-Mogul-Bower Bearings, Inc., Detroit, Mich., a corporation of Michigan
Original application Feb. 11, 1957, Ser. No. 639,276. Divided and this application Mar. 6, 1959, Ser. No. 799,834
5 Claims. (Cl. 18—59)

This invention relates to an important new method for producing fluid-sealing devices. This application is a division of application Serial No. 639,276, filed February 11, 1957.

This invention solves many important problems relating to shaft seals and their manufacture, but it is especially valuable in solving the problem of anchoring a molded elastomeric sealing element to a rigid member such as a metal case. As a result of solving this problem, a much better product can be provided, and it can be produced at a lower cost.

One object of this invention is to provide an improved anchorage for securing a molded elastomeric sealing lip to a rigid member.

Another object of the invention is to provide an improved shaft seal wherein a radially extending annular flange of a case member is provided with an angularly extending or frusto-conical peripheral portion, and wherein a synthetic rubber member providing the sealing lip is anchored substantially exclusively to that peripheral portion.

Another object of the invention is to achieve sealing lip anchorage with a minimum amount of the synthetic rubber composing the lip, thereby providing significant savings in materials and material costs.

Another object of the invention is to provide a very secure anchorage of a synthetic rubber sealing lip to a reinforcing case structure. This anchorage is obtained partly by a novel reforming of an annular edge portion or tip end of a radially extending annular portion of the metal case during molding of the rubber lip portion, the rubber portion being bonded substantially exclusively to this tip end.

Another object of the invention is to provide an improved double-lip seal construction wherein independent action of each lip is achieved.

Another object of the invention is to limit the area where the rubber lip portion is bonded, so that it is only a restricted part of the surface of the case, and to prevent adhesion of rubber, including flash, to other parts of the case.

Another very important object of the invention is to provide a manufacturing method for making shaft seals from metal cases and molded rubber parts with substantial elimination of flash from the bonded portion of the rubber member, especially along the radial case member.

Another object of the invention is to provide a more economical method for making a shaft seal of the molded-lip type. The present invention results in more economical tooling than methods heretofore used, enabling molds having a greater number of cavities per mold than usual, providing molds that may be produced less expensively than heretofore, because of their simplicity, and enabling an increased production capacity per mold. As a result, the total labor cost of production can be considerably reduced.

Another object of the invention is to provide a method for simultaneously molding a rubber lip portion and bonding it to a rigid case in a way that makes it possible to use the same mold for manufacturing a variety of sizes of seals having identical sealing lips attached to any of many sizes of rigid cases.

Another object of the invention is to provide a molding process that leads to improved mold quality.

Another object of the invention is to provide a method for molding a rubber sealing lip member and bonding it to a rigid case without having to use masking or clean-up methods. The new method is insensitive to cement buildup, and metals used as case members may, in fact, be dip-cemented instead of having to be provided with protecting masks, as in the prior art where the cement is sprayed on.

Another object of the invention is to provide a molding method with more positive pinchoff of rubber than has heretofore been possible.

Another very important object of the invention is to provide greater certainty that the mold is being filled solidly with rubber, free from air bubbles. Achievement of this object becomes possible because considerably more molding pressure can be applied in this process than has heretofore been possible in a compression molding process, thereby giving the highest possible density in the rubber molded portion and assuring complete filling of the mold.

Another object is to provide a molding process for fluid sealing lips wherein much wider ranges of molding pressures can be used in the production of satisfactory products.

As implied by the foregoing objects, the product of this invention comprises a fluid seal of the type having an annular rigid case member and an annular synthetic rubber sealing member anchored to the case member by being bonded to it. The case member has an annular radial flange, a peripheral portion of which, in this invention, is turned or bent or formed to provide a frusto-conical annular tip to which the sealing lip is bonded. Moreover, the sealing lip portion is preferably not bonded to any other portion of the case. More specifically, the lip portion is bonded to substantially the entire inner face, the entire end edge and a portion of the outside face of the frusto-conical tip.

The method of the present invention employs a type of compression molding. A metal case having a radially-extending annular flange is inserted around a tapered portion of the mold in a manner which helps to keep its inner and outer rims concentric. In an internal seal, only the inner rim is seated in the mold. As the mold is closed, a prepared ring of synthetic rubber material (known in the trade as "prep") is compressed by the closing mold, so as to flow into the mold cavity. While the rubber is flowing but before it reaches the case, a mold member engages the case and pushes it down, bending the tip end of the flange against the other mold member under very substantial closing pressure. Thus (in an internal seal) the metal case is reformed at the inner pierce (or in an external seal, at the outer periphery). The metal-to-mold contact consists in effect of a pair of circumferential narrow, almost linear, areas on which is exterted a great force that effectively prevents the leakage of stock. As a result, any excess stock that may be present in the "prep" flows around the registration taper instead of flashing at the case. This excess stock is trimmed off later when the trimming knife forms the lip edge. Flashing is eliminated; in fact, the mold can be well overloaded without flashing occurring.

Another way of describing the method briefly is to say that it operates with a "closed stroke," which may be defined as relative movement of the mold halves toward each other closing against the metal member to which the molded member is to be secured. The stroke is maintained "closed" because of the deformation of the metal during the remainder of the mold movement.

Other objects and advantages of the invention will appear from the following description of several preferred embodiments thereof.

In the drawings:

FIG. 9 shows the initial step in the molding cycle with the case member in position on the lower half of the mold prior to the closing of the uper half of the mold and with the "prep," the prepared ring of synthetic rubber stock, in place.

FIG. 10 shows the next step in the molding operation with the upper mold half coming down toward the lower mold half and beginning to press down on the "prep."

FIG. 11 shows the next stage in the molding sequence, with the upper mold half forcing the rubber stock to flow into the mold cavity.

FIG. 12 shows the next step in the sequence, with a rim of the upper mold half contacting the case while a substantial amount of travel still remains. From here on through FIG. 14 the mold executes its "closed stroke," as defined heretofore.

FIG. 13 shows the next step in the molding sequence, in which the mold starts to reform the case while the pressure of this reforming traps the excess stock and begins unloading it through the mold taper instead of permitting it to flash out onto the case.

FIG. 14 shows the last step in the molding sequence, with the mold fully closed and the case permanently formed. In this view, broken lines indicate outer portions of a few of the many different sizes of cases that may be used in this same mold, so long as they have the same size inner pierce.

FIG. 16 is a view similar to FIG. 15 indicating the result of applying a light extra overload, while

Figure 1:
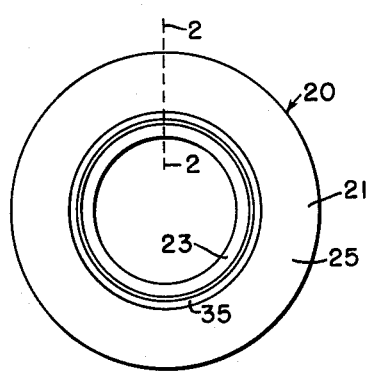
FIG. 1 is a front view in elevation of a shaft seal embodying the principles of the present invention, looking from the left hand side of the seal as shown in FIG. 2.
Figure 2:
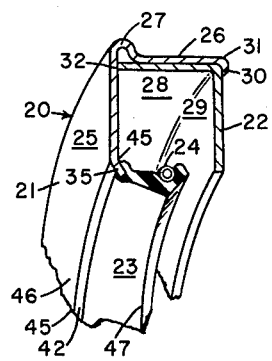
FIG. 2 is an enlarged fragmentary view in perspective and in section taken along the line 2—2 of FIG. 1.

The shaft seal 20 shown in FIGS. 1 and 2 is composed of four principal elements; a rigid metal outer case member 21, a rigid metal inner case member 22, a resilient sealing member 23, and a garter spring 24. The garter spring 24 is not employed with every type of shaft seal and is sometimes omitted (as, for example, in the seal shown in FIG. 8).

The outer case member 21 may be an integral annular member formed to provide a radially extending annular portion or radial flange 25 and an outer cylindrical portion or axial flange 26, which may fit into a housing bore. The axial flange 26 may, if desired, be formed with a radially projecting portion 27 which serves a stop and guide function when placed into the bore, although this is not always necessary or desirable.

The inner case member 22, used in many types of seals but not always necessary, may have an axially extending portion 28 nested into the axial flange 26 of the outer case 21, and a radially extending portion 29, and may be clamped into the outer case 21 by the turned-over edge portion 30 at the inner case corner 31, with the end 32 of the axial portion 28 bearing against the radial flange 25.

A very important structural feature of the product of the present invention is the generally frusto-conical end portion o rtip 35 of the radial flange 25 to which the sealing member 23 is bonded. This tip 35 may be either at the inner periphery or pierce in an internal-type seal (FIGS. 1–7), or at the outer periphery of an external-type seal (FIG. 8), and the tip 35 may either be turned axially inwardly (FIGS. 1–6 and 8), or axially outwardly (FIG. 7). The important thing is that to that tip portion 35, and substantially to that portion only, is bonded the rubber sealing member 23.

Figure 3:
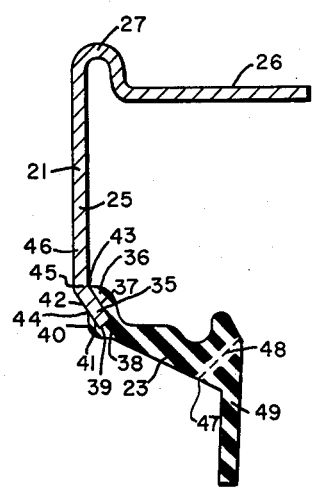
FIG. 3 is a further enlarged sectional view of the case member and sealing lip of FIG. 2, the sealing lip being shown in this view before trimming, with the trim line indicated by a broken line.

As shown in FIG. 2 and FIG. 3, the anchorage of the sealing lip 23 is accomplished by a generally radial or frusto-conical portion 36 bonded to the inner face 37 of the tip 35, a portion 38 bonded to the end edge 39 (which may be very small, depending on the thickness of the metal used for the case member 21), and an outer portion 40 bonded to a portion 41 comprising part but not all of the outer face 42 of the tip 35. The synthetic rubber which may be of any desired oil-resistant type, as known well in the art, stops sharply at points 43 and 44, respectively, of the inner and outer faces. Note that the cutoff 43 lies right at the corner 45 where the tip 35 joins the radial portion 46 of the flange 25. Also note that the cutoff 44 lies between (approximately half way between) the edge 39 and the corner 45 on the outer face 42. How these sharp flashless cutoffs are obtained will be explained along with the method, and it will then be clear what is accomplished. For the present, it will be noted that the sharp cutoff and the confining of the rubber anchorage to the tip 35 gives adequate and accurate anchoring of the seal member 23 without excess volume of material and without flash, which would be objectionable. Substantial amounts of rubber are saved by this method, while the very tight bond provides quite accurate holding.

The sealing lip 47 is easily obtained by one simple knife cut along the line 48 in FIG. 3, cutting off the excess portion 49. This trimming is the only operation after molding, due to the absence of flash from the seal 20.

Figure 4:
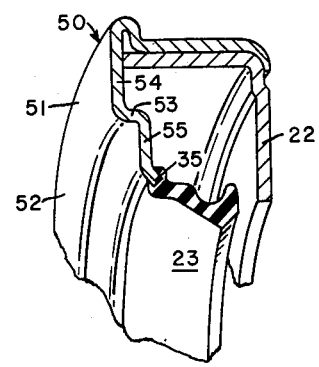
FIG. 4 is a view similar to FIG. 2 of a modified form of seal, also embodying the invention but having a somewhat differently formed case member.

A seal 50 shown in FIG. 4 is substantially like the seal 20 shown in FIGS. 1 through 3 and is made in substantially the same manner. It is illustrated principally to show the use of an outer case member 51 which has a stepped radial flange 52, showing that the flange need not be radial over its entire width. The step 53 between outer portion 54 and inner portion 55 does not affect the present invention; it is important that there be a radial portion like the portion 55, and a peripheral portion formed into a tapered or frusto-conical annular tip 35 (at either the inner pierce or the outer periphery of the seal) to which the sealing member 23 is attached. The relative widths of the radial portion and peripheral portion are not important, except as hereinafter noted.

Figure 5:
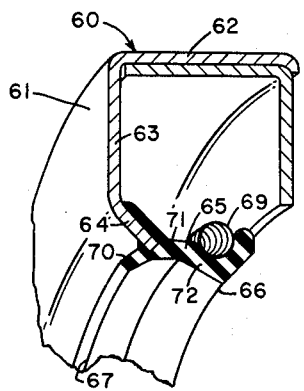
FIG. 5 is a view similar to FIG. 2, though on an enlarged scale, of another modified form of seal, this one having a double lip. In this instance, the invention acts to provide independence of the two lips from each other.
Figure 6:
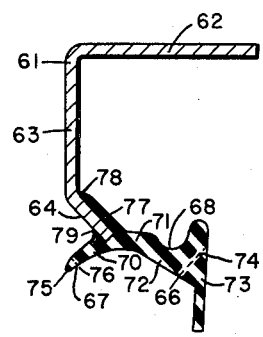
FIG. 6 is a view similar to FIG. 3 showing a portion of the structure of FIG. 5 before trimming, with the trim lines for the two lips indicated in broken lines.
Figure 7:
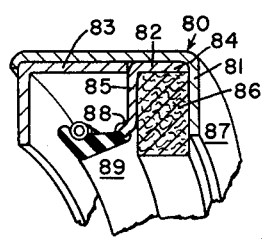
FIG. 7 is a view similar to FIG. 2 showing another modified form of seal.

The seal 60 shown in FIGS. 5 and 6 has some special features and advantages which should be noted; in addition, a simpler form of case member 61 is shown, having an axial flange 62, a radial flange 63, and a tip portion 64. The principal difference, however, is that its resilient sealing lip member 65 is provided with two lips, 66 and 67, The lip 67 may be used for sealing out dust rather than for fluid sealing, while the fluid is sealed by the lip 66. The lubricant-sealing lip 66 may be provided with a spring-receiving cavity 68 to receive a garter spring 69, while the dust-sealing lip 67 requires no spring.

Independence of these two lips 66 and 67 from each other is a greatly desired quality but one that is not easily obtained. However, the present invention does give this desired independence, because the dust-sealing lip 67 is on the opposite side of the in-turned, frusto-conical portion 64 from the fluid-sealing lip 66, and the dust lip 67 is backed up by and supported substantially directly by the tip 64 and its lip base 70. A diaphragm-like web portion 71 connects the dust lip base 70 to the base 72 of the lubricant-sealing lip 66, which is supported by a different part of the tip 64. As a result, any movement of the spring-urged sealing lip 66 is not transmitted to the dust sealing lip 67, which is kept independent, and vice versa. This independence is an important advantage of the present invention, where it is easily obtained; whereas it was very difficult and, in some cases, impossible to provide with prior art lip anchorages.

FIG. 6 shows the seal 60 as it comes from the mold. (See FIG. 18). In this instance, the sealing lip 66 is formed by trimming off the excess portion 73 along the line 74, while the sealing lip 67 is formed by trimming off the excess portion 75 along the line 76. Note that again, as in all forms of the invention, the larger portion 77 of the rubber anchor stops short at the corner 78. The other cutoff 79 again lies on the outer face of the tip 64 intermediate its edge and the corner 78.

FIG. 7 shows a seal 80 having an outer case 81 enclosing two inner cases 82 and 83. The inner case 82 has an axial flange 84 and a radial flange 85, and a felt ring 86 is compressed between the flange 85 of the case 82 and a radial flange 87 of the case 81. Because of this felt ring 86, the flange 85 is provided with a tip 88 bent in the opposite direction from the tips 35 and 64 described heretofore. In other words, a synthetic rubber sealing member 89 is to be provided and it cannot be located where the felt ring 86 is to be. Therefore, the annular tip or frusto-conical peripheral portion 88 is formed on the opposite side of the flange 85 from the flange 84 instead of on the same side, as in FIGS. 1-6. This illustrates the flexibility of the invention.

Figure 8:
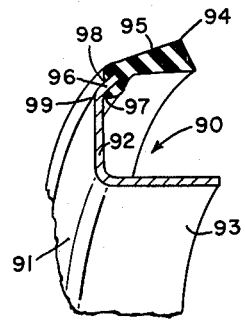
FIG. 8 is another view similar to FIG. 2 showing an external-type seal.

An external-type seal 90 is shown in FIG. 8. Here the seal 90 has a case 91 with a radial flange 92 extending radially outwardly from a radially-inner cylindrical portion 93. The cylindrical portion 93 is adapted to be secured rigidly to a shaft for rotation therewith, while the housing bore is wiped by a sealing lip 94. The sealing member 95 is anchored to a frusto-conical peripheral portion or annular tip 96, as before, the only difference being that the tip 96 is at the outer periphery of the case instead of at the inner periphery as in tips 35, 64 and 88. External seals may have garter springs but, just for an example, a springless seal has been shown. Note that the cutoff points 97 and 98 are analogous to the cutoff points 43 and 44, the point 97 lying at the corner 99 formed by the tip 96.

The foregoing examples illustrate the basic principles of the product aspects of the invention, but by no means exhaust its possibilities. Men skilled in the art will be quick to see how the invention applies in many fields and to many types of seals, and will readily be able to design further modifications, all coming within the scope of this invention. Certain other important product features will have to be deferred until after a discussion of the method by which the product is preferably made.

The method of the invention using my new "closed stroke" process will now be described. The molding sequence of the seal of this invention is shown in FIGS. 9 through 14. As will be seen, the mold used has two parts, a lower mold-half or block 100 and an upper mold-half or die 101. The lower block 100 is generally cylindrical with a periphery 102 from which extends radially inwardly a seat 103. At the inner end of the seat 103 there is a short cylindrical portion 104 leading to a short shelf 105 adapted to support the inner periphery 106 of a case member 107. The shelf 105 preferably is curved as shown and terminates in a cylindrical portion 108 that leads to a taper portion 109 which aids in loading and centering the case member 107 in the proper position, but whose main purpose is the shaping of the sealing lip, as the portion 108 shapes the web. Centering, however, is important since the outer periphery of the case member 107 lies outside the mold and is not used in centering. Before the molding operation begins, a suitable bonding cement is applied to the case member by spraying, dipping, or other suitable means.

Above the tapered block portion 109 lies a generally radial platform 110 on which the ring 11 of "prep" stock (any suitable elastomer) is placed. The radially inner end of the platform 110 joins a second tapered portion 112, which in turn ends at a central circular table portion 113.

The upper mold half or die 101 has a generally similar shape but by no means a matching one, since the mold is made to provide a proper cavity for forming the elastomeric sealing lip 115. The die 101 is also generally cylindrical, and its periphery 120 is generally in line with the periphery 102. The die 101 has adjacent its periphery 120 a narrow circular rim 121 designed to engage the case and press it against the lower block 100 in a closed stroke, an action very important in the present invention. Radially inwardly of the rim 121 is the major cavity portion 122, of whatever shape is suitable, terminating in an extended radial portion 123, part of which overlies the platform 110 and is the first portion to contact the prep ring 111. The inner end of the portion 123 leads to a tapered portion 124 that lies opposite the taper 112. The portion 124, in turn, leads to a toroidal trap 125 bounded on its radially inner edge by a short annular rim 126. The die 101 is annular and has an inner periphery 127 surrounding a central cylindrical recess 128.

Figure 9:
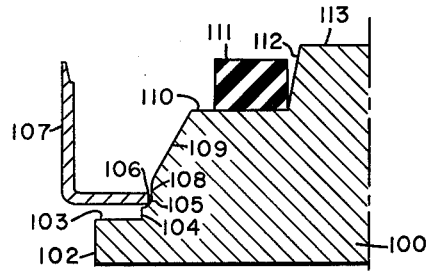
FIGS. 9 through 14 show a molding cycle embodying the method of the invention as applied to an internal-type seal. These views are in elevation and in section of the left half of the mold.

In FIG. 9, the mold is open. The metal ring 107 rests on the shelf 105 at its inner peripheral edge 106 only. The ring 111 of prep stock rests on its platform 110. The mold is now ready to be closed.

Figure 10:
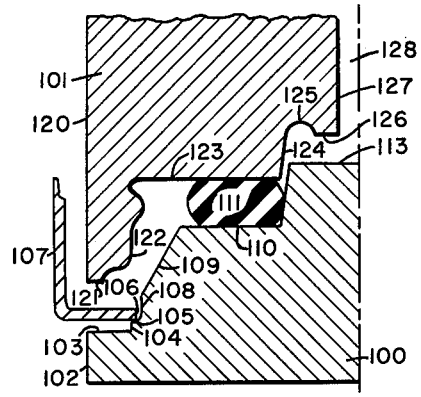
Figure 11:
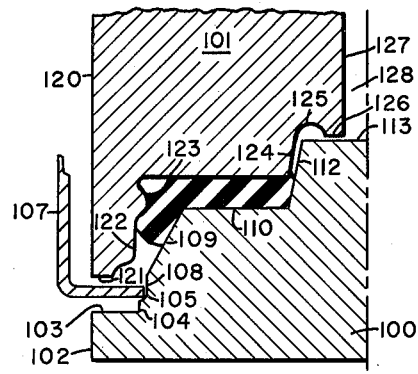
Figure 12:
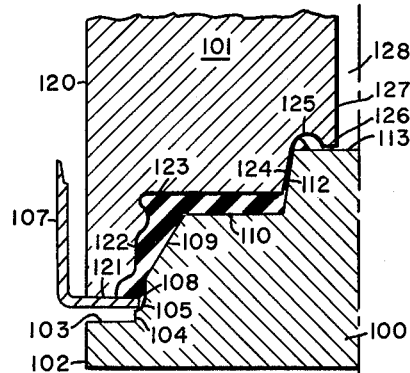

In FIG. 10, the upper mold half or die 101 has been lowered part way. It engages the prep stock 111 and begins to squeeze it. The mold is heated; so the stock will soon begin to flow, but at this point the prep stock 111 is simply deformed a small amount and does not flow. Further downward movement of the die 101 (FIG. 11) begins to force the stock down into the mold cavity as it follows the path of least resistance, as compared with the restricted path up between mold faces 112 and 124. The rubber, however, cannot flow fast enough to reach the case 107 before the die rim 121 does (FIG. 12). The rim 121 engages the case 107 about ½₀" before the end of its stroke. In FIG. 12, the mold cavity is still not filled.

Figure 13:
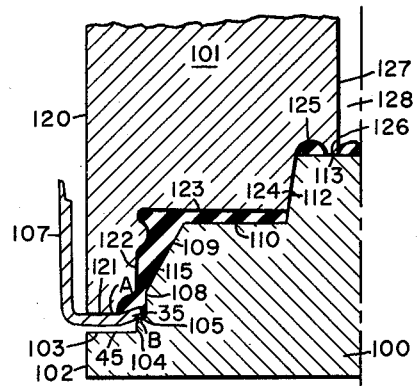
Figure 14:
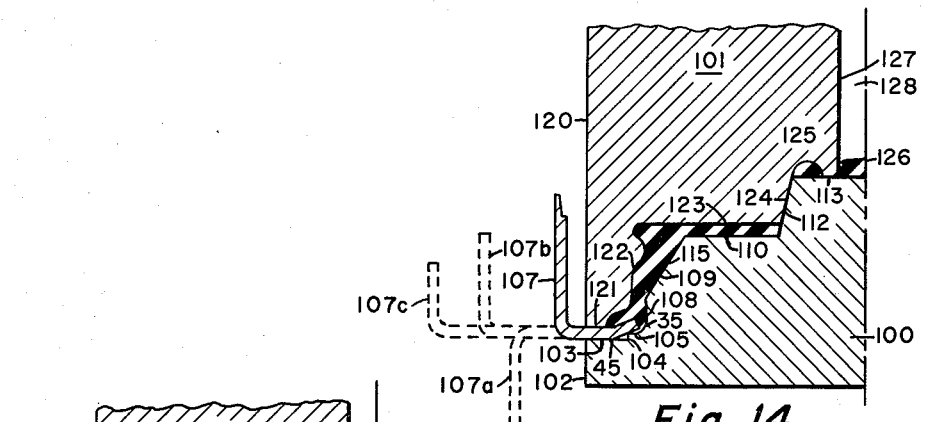

Further downward movement of the die 101, as shown in FIG. 13, causes the case 107 to reform, forming the frusto-conical portion or annual tip 35. The pressure of forming at A and B (the opposite ends of the corner 45 from which the tip 35 is bent) traps the flowing elastomer so that it cannot seep out and cause flash anywhere, as the bending forms the corner 45. Now it can be seen why the cutoff at 43 and 44 is sharp and flashless and why it occurs where it does. The unit pressure at points A and B may be upwards of 50,000 p.s.i., since the total force applied to closing the mold is exerted on a very small area. Tests have shown that no flash extrudes beyond points A and B even with severe overloading, due to these high unit pressures achieved. Any excess stock present unloads upwardly from the platform 110 through the passage between the tapers 124 and 112, toroidal trap 125, and out between the portions 113 and 126 to the recess 128. For normal loading, as shown in FIG. 14, the recess 128 will be only slightly filled. This is with an overload of about 15%, enough to insure complete filling of the mold cavity and provide a low amount of rubber wastage.

As shown in FIG. 14, the last in the molding sequence, another feature of this invention is that various sizes of rings, 107, 107a, 107b, 107c, etc., may be used as long as the inner pierce 106 is the same. In other words, with the same size shaft but different housings or bores, a great variety of rings can be treated in the same mold and provided with substantially the same sealing member. This is a very important feature of the invention.

Figure 15:
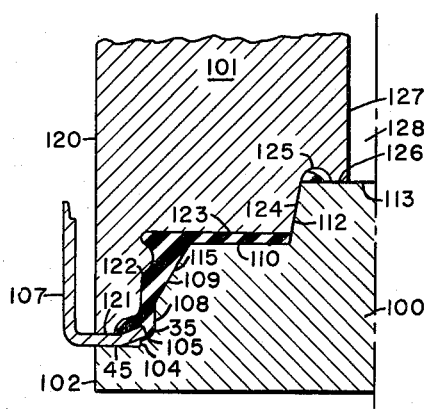
FIG. 15 is a view similar to FIG. 14 but illustrating what happens when there is a minimum amount of load in the mold, much less than the normal average overload used.

As shown in FIG. 15, even if the mold is substantially underloaded, the cavity where the lip is formed will be completely filled because of the great pressure placed on the prep. There, the rubber filled the mold but barely sent a little rubber up between tapers 112 and 124 into the trap 125.

Figure 16:
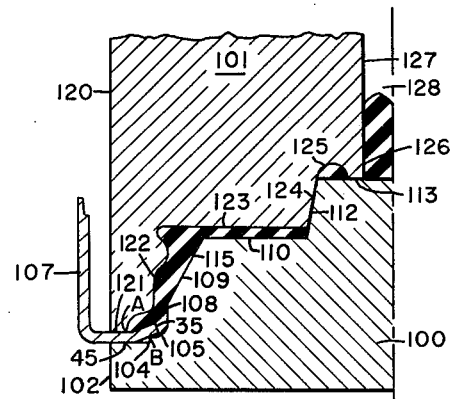
Figure 17:
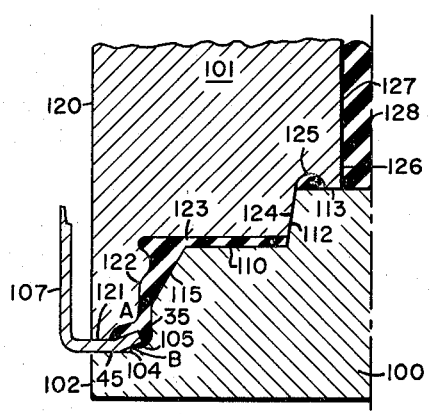
FIG. 17 is a similar view in which there has been a very heavy overload.

As shown in FIGS. 16 and 17, there is no flash past points A and B, even with severe overloading, but the excess stock flows into the recess 128. In fact, tests have shown that until the entire recess 128 is filled and the rubber has nowhere else to flow, there will be no movement past points A and B. In order to get such movement it was found in tests that overloads of 10% or more had to be applied which, of course, is far beyond what would be encountered in manufacture.

Figure 18:
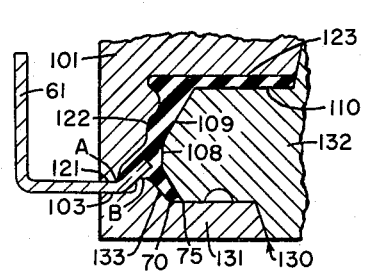
FIG. 18 is a view similar to a portion of FIG. 14, showing a mold for a seal like that of FIGS. 5 and 6.

FIG. 18 shows how a seal 60 (see FIGS. 5 and 6) may be molded. While only a portion of the mold is shown, the other parts are like those described and shown in FIGS. 9 through 14. In fact, the upper mold half 101 may be the same as that already described. The lower mold half 130 is preferably made up of two elements 131 and 132, because of the re-curving of the dust lip portion 70. In this instance, the formation of the lower mold half 130 is nevertheless substantially the same as that of the element 100 except for the provision of a dust lip molding cavity 133 bounded by the two mold portions 131 and 132. Again, the corners A and B are used to provide the forming pressure, though the area of the corner B in this example is shown somewhat larger than in FIGS. 9 through 14. This is possible because in this instance the terminal portion 64 is bent out at a larger angle approximately 45°.

It should be noted that, in the invention as a whole, an important feature is the provision of a closed stroke mold operation to insure that both the upper and lower mold halves contact the metal insert before the mold is completely closed. The closed stroke is achieved, as described, by deforming the metal insert. It has been found by tests, practical experience, and theoretical calculations that the minimum practical deformation is approximately 0.015″ deformation of the end edge from the flat. In other words, the periphery is lifted at least 0.015″ above the plane of the radial flange, and this means that each point on the edge is lifted at least that far above the plane of its previous surface. The upper limit of deformation depends solely on the seal design. It may be 0.200″ or higher.

The radial width of the deformed portion may vary over relatively wide limits, once deformation of at least 0.015″ has been achieved. It may be very narrow or it may be very wide, though for the best practical results neither the narrowest nor the widest feasible limits are ideal, and the drawings give a good indication of desirable proportioning. The minimum radial distance between points A and B will depend upon the metal thickness and the actual amount of deformation being used. The upper point A must be at a greater radius from the center than the lower point B; otherwise, the line of action of the force applied would be through the same point, not allowing deformation of the metal and therefore not achieving a closed stroke.

Once the conditions of the preceding paragraphs have been met, there is a wide field for variation within the scope of this invention, and what is preferable in one instance may not be preferable in another instance. For example, the point B may lie at any location between the actual peripheral edge of the finished seal and the corner about which it is turned, so long as the preceding conditions are fulfilled. It is possible to have the point B actually at the peripheral edge, but it is difficult, due to engineering and manufacturing tolerances, to be assured of control when the apparatus is designed for such close contact. For that reason, it is better to have the point B in between the point A and the peripheral edge. Similarly, it is better to have the point B not lie too close to the corner, for the same general reasons, and also to insure proper length of the closed stroke by having the point B lie enough above the shelf 103 to insure a closed stroke. The amount of rubber which is bonded between the point B and the peripheral edge, as in the position 40, is not of critical importance in practicing the method, though for any practical product one distance may be better than another.

It is not absolutely necessary that the metal be deformed beyond its elastic limit in the tip portion. It is possible to practice the method with a closed stroke within the elastic limit, so that the metal after molding returns to its original flat radial position. However, it is definitely preferable that the deformation be permanent and that the elastic limit be passed, because this gives greatly improved dimensional stability and will produce a much better appearing product.

As has been stated earlier, the amount of deformation is of more importance than the angle of deformation, but this does not mean that the angle itself is not important. Even with products lying within the scope of the invention, there are some that utilize the invention in its best and most practical form. While a relatively small angle will obtain some of the advantages of the invention, at least to a degree, the advantages are not generally fully obtained in a seal having a narrow tip, nor does the finished seal have a fully satisfactory appearance until the metal has been deformed at an angle of about 25° or greater, and in fact, an angle of 30° is preferably employed. Moreover, the width of the tip should not be too great if economy in the amount of rubber used for bonding is to be obtained. There is also a practical maximum limit of angle for most applications of the invention, due to the effect that the bending has, at angles greater than 45°, of pulling the inner pierce too far away from the shaft, and so a practical maximum of bending normally lies around 50°. This does not mean that seals cannot be made having extended molded portions to make up for the bending of the tip end portion, but it does mean that the best support for the sealing element is obtained in an angle less than 50°. In other words, dimensional stability, economy used in the amount of rubber used in the bonding, and assurance of a closed stroke will usually combine to set a lower limit of 25°, although bending below that amount does not normally affect the sealing function of the device as such. On the other hand, above 50° the sealing function may be affected, as well as the economy of the material and greater angles import some compensation elsewhere if a satisfactory seal is to be applied. Thus, the range between approximately 25° and 50° is considered to encompass the preferable embodiment of the invention, with the range between 30° and 45° giving the best results of all.

The foregoing paragraphs distinguish the present invention from disclosures where the portion immediately adjacent the periphery is bent very slightly, reforming only the bare peripheral portion, if anything, in order to cut off the molded rubber at the peripheral edge instead of permitting it to flow along the edge and engage the outer edge of the reinforcing ring—as it does in this invention.

Economy in tooling results from the fact that the upper and lower pieces of the mold are the only mold parts needed, since the outside diameter of the mold is not affected by the outside diameter of the case member. Case members of varying radial extent may be used so long as the pierces, the periphery to which the sealing portion is applied, are identical, and the same mold is used regardless of which radial face of the flange the rubber is bonded to. Alternatively, it is possible with molds of this type to provide more cavities per unit area in a multi-cavity mold, since there is no need to confine the outer periphery of the case and, since the case lies outside the mold proper, the cases obviously can be closer to each other than they could be where a mold part had to be in between them. Also, there is more tooling capacity per the amount of money spent on the mold, resulting in more production at lower cost, because of the convenience and ease of insertion of the parts. The fact is, a better quality of mold is obtained because of the smaller less complex mold area, which can be given more careful attention and can be cleaned and maintained more easily than can molds where the cavities are more complex or are larger. The elimination of flash also supplies another reason why the mold is easier to maintain, is easier to clean, and must be polished less often.

The location feature which has been referred to is another very important advantage of this invention. Concentricity is assured so long as the inner pierce itself is properly made, since the pierce absolutely locates the case in the mold.

To those skilled in the art to which this invention relates, many additional changes in construction and widely differing embodiments of the invention will suggest themselves without departing from the spirit and scope of the invention as defined in the claims.

What is claimed is:

1. A method for flashless molding and simultaneous bonding of an elastomeric sealing lip for a shaft seal, to an annular metal case element having a radial portion with opposite radial faces and an axially extending peripheral edge extending between the faces, which comprises supporting said element only about the peripheral marginal portion of one radial face thereof, applying axial pressure to the opposite face of the element in a circular line radially spaced from the peripheral marginal portion to move the body of the case element relative to the marginal portion against a seat member to thereby provide a marginal flange portion bent at an obtuse angle to the other radial face, simultaneously applying elastomeric material against the exposed surface of the case element extending between the line at which the pressure is being applied and the support for the marginal portion on the other face of the case element, and bonding the elastomeric material to the case element without flash by the applied axial pressure.

2. A method for flashless molding and simultaneous bonding of an annular elastomeric sealing lip for a shaft seal, to an annular metal case element having a radial portion with two opposite radial faces and an axial peripheral edge extending between the faces, comprising axially applying pressure in one direction to one face of the case element in a circular line radially displaced from the peripheral edge to seat the opposite face of the case element against an underlying support, axially applying pressure in the opposite direction to the other face of the case element in a second circular line between the first-named circular line and the periphery to provide a marginal flange bent at an obtuse angle relative to the first radial face, applying elastomeric material to both faces of the case element at an area extending between the two pressure zones, and bonding the elastomeric material to the case element without flash by the applied axial pressure.

3. A method for flashless molding and simultaneous bonding of an elastomeric sealing lip for a shaft seal, to an annular metal case element having a generally radial portion with opposite faces and an axially extending peripheral edge extending between the faces, which comprises centering said case element with one face on a hollow annular support of lesser diameter than the case element, applying axial pressure to the other face of the case element in a circular line concentric with and radially spaced from the annular support to move the central portion of the element until the peripheral margin is bent away from the plane of the annular support at an obtuse angle to the central portion of the element, applying elastomeric material to the face of the element between said circular line and the periphery simultaneously with the initial application of the axial pressure, and bonding the elastomeric material to the case element without flash between said circular line and the annular support and about the periphery upon continued application of the axial pressure to produce the bent peripheral margin.

4. A method for flashless molding and simultaneous bonding of an annular elastomeric sealing lip for a shaft seal, to an annular metal case element having a radial portion with two opposite radial faces and an axial peripheral edge extending between the faces, comprising axially applying pressure in one direction to one face of the case element in a circular line radially displaced from the peripheral edge to seat the opposite face of the case element against a parallely extending underlying support, axially applying pressure in the opposite direction to the other face of the case element in a second circular line between the first-named circular line and the periphery to provide a marginal flange bent at an angle relative to the first radial face, applying elastomeric material to both faces of the case element at an area extending between the two pressure zones, and bonding the elastomeric material to the case element without flash by the applied axial pressure.

5. A method for flashless molding and simultaneous bonding of an elastomeric sealing lip for a shaft seal, to a rigid annular metal case element having a radially extending portion with opposite faces and having inner and outer peripheries which comprises, applying pressure in one direction against one face of the element in a circular line adjacent one of said peripheries and simultaneously applying pressure in the opposite direction against the opposite face of the element in a concentric circular line radially spaced from the one periphery to produce an annular peripheral margin bent at an angle to the radially extending portion, applying elastomeric material against the exposed surface of the case element extending between the pressure zones and bonding the elastomeric material to the case element without flash by the applied axial pressure.

References Cited in the file of this patent

UNITED STATES PATENTS

| 2,146,677 | Johnson | Feb. 7, 1939 |
| 2,145,928 | Heinze et al. | Feb. 7, 1939 |
| 2,700,186 | Stover | Jan. 25, 1955 |
| 2,772,012 | Crabtree | Nov. 27, 1956 |

FOREIGN PATENTS

| 1,046,916 | France | Dec. 9, 1953 |